United States Patent [19]

Morita et al.

[11] Patent Number: 4,636,448

[45] Date of Patent: Jan. 13, 1987

[54] MAGNETIC RECORDING MEDIUM

[75] Inventors: Haruyuki Morita; Jiro Yoshinari; Kazumasa Fukuda, all of Tokyo, Japan

[73] Assignee: TDK Corporation, Tokyo, Japan

[21] Appl. No.: 691,883

[22] Filed: Jan. 16, 1985

[30] Foreign Application Priority Data

Jan. 26, 1984 [JP] Japan .................................. 59-10998

[51] Int. Cl.$^4$ ............................................. B21C 37/00
[52] U.S. Cl. .................................... 428/607; 428/611; 428/624; 428/625; 428/626; 428/630; 428/650; 428/652; 428/678; 428/686; 428/928; 360/134; 360/135
[58] Field of Search ............... 428/607, 611, 624, 625, 428/626, 630, 650, 652, 678, 686, 928; 360/134, 135

[56] References Cited

U.S. PATENT DOCUMENTS

| | | | |
|---|---|---|---|
| 4,410,603 | 10/1983 | Yamamori et al. | 428/611 |
| 4,439,795 | 3/1984 | Kitamoto et al. | 360/134 |
| 4,539,264 | 9/1985 | Yazawa et al. | 428/928 |

FOREIGN PATENT DOCUMENTS 57-208631 12/1982 Japan .

Primary Examiner—John P. Sheehan
Attorney, Agent, or Firm—Oblon, Fisher, Spivak, McClelland & Maier

[57] ABSTRACT

In a magnetic recording medium particularly for perpendicular magnetization comprising a non-magnetic substrate and a magnetic thin film formed on the surface thereof and including at least two layers, a lower layer with low coercive force and high permeability, for example, of permalloy is sputtered on the substrate and an upper layer for perpendicular recording, for example, of cobalt-chromium alloy is sputtered on the lower layer, and the average grain diameter of the lower layer is less than one half of that of the upper layer.

6 Claims, 7 Drawing Figures

FACE (111)

MAGNETIC RECORDING MEDIUM

The present invention relates to a magnetic recording medium comprising a multilayer magnetic thin film formed on a non-magnetic substrate. More specifically, it relates to a perpendicular recording medium of such type having improved surface smoothness and orientation.

BACKGROUND OF THE INVENTION

Over the past few years, several "perpendicular recording media" so called because the recording medium is magnetized perpendicular to the surface of its magnetiazble thin film, have been proposed for increasing magnetic recording density. Japanese Patent Publication No. 58-91 discloses one perpendicular recording medium comprising a polyimide substrate and a two-layer magnetic thin film thereon, one layer on the substrate being a low-coercive force layer of molybdenum-/iron/nickel and the other layer thereon being a magnetic recording layer of cobalt/chromium. Magnetic thin films of this two-layer structure type provide a number of advantages. Since the magnetic circuit on the back surface of the perpendicularly magnetizable cobalt/chromium film is partially closed by the high permeability, low coercive force magnetic layer, magnetic deterioration is minimized and residual magnetization is enhanced.

Magnetic thin films having the overall desired properties can be obtained by making the magnetic thin film a multilayer structure consisting of layers with different properties.

It has hitherto been the practice to form a magnetic thin film having such a two-layer structure by heating the non-magnetic substrate to temperatures above room temperature (250° C. in examples described in Japanese Patent Publication No. 58-91), forming a low coercive force, high permeability magnetic layer thereon by sputtering, and further forming a magnetic recording layer of cobalt/chromium thereon by sputtering. Referring to FIG. 1, a low coercive force, high permeability magnetic layer 1 formed by this process has an average grain diameter B which is equal to or more than the average grain diameter A of a cobalt/chromium layer 2. More perticularly, the surface of the underlying high permeability magnetic layer is microscopically so irregular as to affect the overlying cobalt/chromium layer 2 being formed, resulting in the disordered orientation of columnar cobalt/chromium grains with deteriorated surface planeness.

Further, various crystal faces including (110), (111) and (100) are exposed on the surface of the low coercive force, high permeability magnetic layer. If a magnetic recording layer destined for perpendicular magnetization is formed on this high permeability magnetic layer, the random crystal faces on the surface of the underlying magnetic layer will affect the overlying magnetic recording layer being formed particularly at the initial stage of the process. When a permalloy film is used for the low coercive force, high permeability magnetic layer and a cobalt/chromium film is used for the magnetic recording layer destined for perpendicular magnetization, there is a likelihood of cobalt/chromium grains growing with their (001) face in conformity with the (111) face of the permalloy grains. That is, the cobalt/chromium grains tend to grow in the directions of arrows shown in FIG. 2. As a result, cobalt/chromium grains are randomly oriented to form a cobalt/chromium film having an irregular surface as shown in FIG. 1.

SUMMARY OF THE INVENTION

An object of the present invention is to provide a magnetic recording medium comprising a thin film of a multilayer structure having improved surface smoothness and orientation.

According to the present invention, there is provided a magnetic recording medium comprising a non-magnetic substrate and a magnetic thin film formed on the surface thereof and including at least two layers, an upper layer having an average grain diameter A and a lower layer having an average grain diameter B, wherein the lower layer is contiguous to said upper layer and closer to the non-magnetic substrate, and the average grain diameter B of the lower layer is less than one half of the average grain diameter A of said upper layer.

DETAILED DESCRIPTION OF THE INVENTION

According to the present invention, the average grain diameter B of the lower magnetic metal layer is less than one half ($\frac{1}{2}$) of the average grain diameter A of the upper magnetic metal layer. The upper layer should be contiguous to or in direct contact with the lower layer which should be located closer to, preferably on the substrate.

Figure 1:
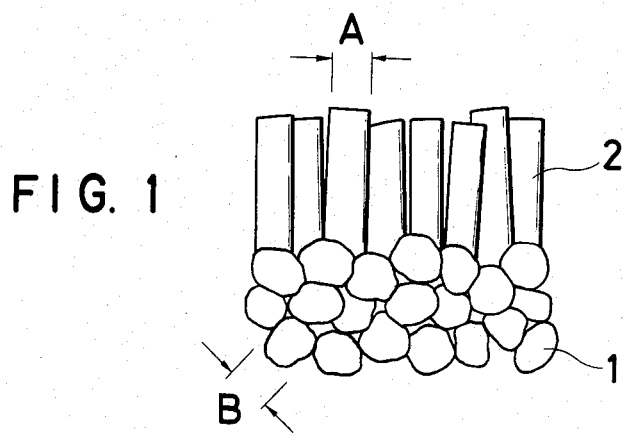
FIG. 1 is a microscopic schematic view showing the grain structure of a prior art magnetic recording medium for perpendicular magnetization.
Figure 2:
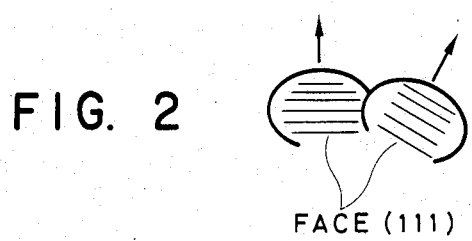
FIG. 2 illustrates some grains on the high permeability layer of the medium of FIG. 1, the grains being randomly oriented.
Figure 3:
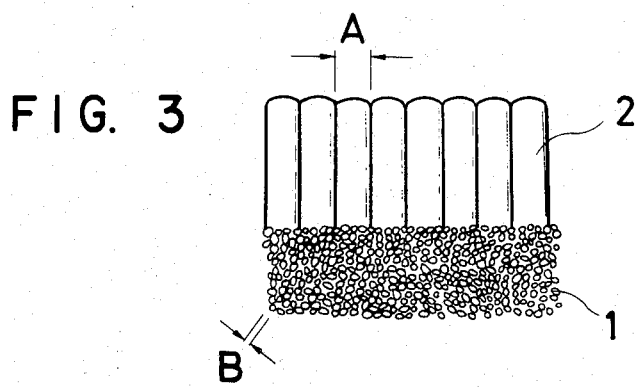
FIG. 3 is a schematic view showing the grain structure of a magnetic recording medium for perpendicular magnetization according to the present invention.

In one preferred embodiment as shown in FIG. 3, the average grain diameter B of the lower magnetic layer is sufficiently smaller than that of the upper layer. The microscopic surface irregularity of the lower layer is then minimized and the effect of various crystal faces of the lower layer is leveled to a negligible degree. This allows an upper layer having an excellent surface smoothness to form without disturbing the orientation of its grains during growth.

In one preferred embodiment of the present invention, a perpendicular or vertical recording medium is prepared by forming a low coercive force, high permeability magnetic layer having a smaller average grain diameter B on the surface of a non-magnetic substrate, and forming a perpendicular magnetizable layer having a larger average grain diameter A on top of the high permeability film. The lower magnetic layers with low coercive force and high permeability may be formed using alloys such as Permalloy, Alperm, and Sendust, various types of ferrites, or the like. The permalloy is especially desirable because of its high magnetic permeability.

The magnetic layers with low coercive force and high permeability may be formed to a thickness in the range of about 0.1 to 1.0 μm by any well-known techniques such as sputtering, vacuum deposition or evaporation, plating and chemical vapor deposition (CVD). When the magnetic layer is formed by sputtering, the average grain diameter B thereof may be controlled by a proper combination of the substrate temperature, electric discharge power, argon gas pressure and the like. The lower the substrate temperature, electric discharge power and argon gas pressure, the smaller the average grain diameter B is. A suitable choice of these factors can reduce the average grain diameter B to less than one half ($\frac{1}{2}$), and more preferably, to less than one fifth (1/5) of the average grain diameter A of the upper layer.

As will be later described in Examples, as the average grain diameter B of the low coercive force, high permeability magnetic film is reduced smaller than the average grain diameter A of the perpendicular magnetizable film, the half-value width $\Delta\theta_{50}$ of the locking curve of the hcp (002) face which indicates the degree of orientation of grains in the perpendicular magnetizable film is reduced, resulting in perpendicular magnetizable films with improved grain orientation. When B is less than $\frac{1}{2}$ of A, $\Delta\theta_{50}$ is less than 5°, that is, the film is suited for perpendicular recording. The film is best suited for perpendicular recording when B is less than 1/5 of A because $\Delta\theta_{50}$ is then less than 3°.

The perpendicular magnetizable films may be formed from alloys such as cobalt-chromium (Co-Cr), cobalt-vanadium (Co-V), etc., cobalt-phosphorus (Co-P), and the like. The use of cobalt-chromium is desirable because perpendicular anisotropy is easily controllable.

The perpendicular magnetizable film may also be formed to a thickness in the range of about 0.1 to 1.0 μm by any well-known techniques such as sputtering, vacuum deposition or evaporation, plating, and chemical vapor deposition (CVD).

The average grain diameter of the films as used in the present invention may be directly determined by observing film sections under a scanning electron microscope (SEM) and a transmission electron microscope (TEM). The average grain diameter may also be indirectly measured by X-ray diffraction (see Kality "X-Ray Diffraction", published by Agne, Chap. 9) although it is not desirable because of low accuracy.

Typically, the average grain diameter ranges from 70 to 400 angstroms for permalloy and from 200 to 800 angstroms for cobalt-chromium alloys, both when sputtered. These values are given merely by way of illustration, and the present invention is not limited thereby.

The non-magnetic substrate used herein may be films of plastic materials such as polyimides and polyesters, typically polyethylene terephthalate, and discs of metals such as aluminum and inorganic materials such as glass.

The present invention is not limited to the embodiments described above, and is applicable to a variety of magnetic layers. Moreover, it is capable of providing magnetic recording media having a multi-layer magnetic thin film with improved surface smoothness and orientation. The thin film used herein has a thickness of not more than 10 μm.

Examples of the present invention are presented below by way of illustration and not by way of limitation.

EXAMPLE

Figure 4:
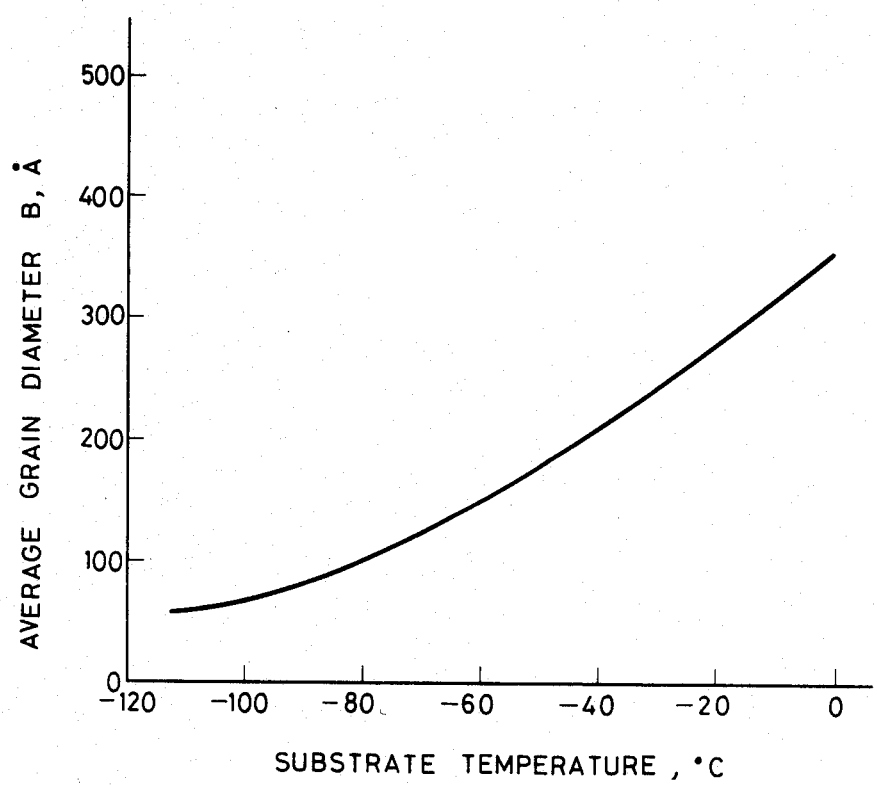
FIG. 4 is a graph showing the average grain diameter B of the high permeability layer in relation to the substrate temperature.

A substrate in the form of a 50 μm polyimide film mounted on a holder was placed in a vacuum chamber, which was evacuated to $2\times10^{-6}$ Torr. Argon gas was then introduced to a pressure of $1\times10^{-3}$ Torr, and the substrate cooled to different temperatures with a refrigerant circulating near the substrate. A permalloy was RF sputtered for 15 minutes with a power of 50 watts to form a permalloy film on the substrate. The permalloy film thus obtained had a composition of Fe:Ni:Mo of 17:78:5 by weight and a thickness of 0.5 μm. The average grain diameters B of the permalloy films obtained at different substrate temperatures were measured by observing a film section under TEM. The results are plotted in FIG. 4. As seen from the curve, the average grain diameter B of the permalloy film can be controlled from 340 angstroms to 70 angstroms by reducing the substrate temperature from 0° C. to −100° C.

Next, on the various permalloy films obtained at different substrate temperatures, a cobalt-chromium alloy was RF sputtered for 10 minutes in an argon atmosphere under a pressure of $5\times10^{-3}$ Torr with a power of 200 watts with the substrate kept at room temperature, forming cobalt-chromium alloy films on the permalloy films to yield two-layer films. The cobalt-chromium films all had a composition of Co:Cr of 80:20 and a thickness of 0.5 μm. By observing a film section under TEM, the cobalt-chromium films were measured to have an equal average grain diameter A of 500 angstroms independent of the substrate temperature during formation of the permalloy films.

Figure 5:
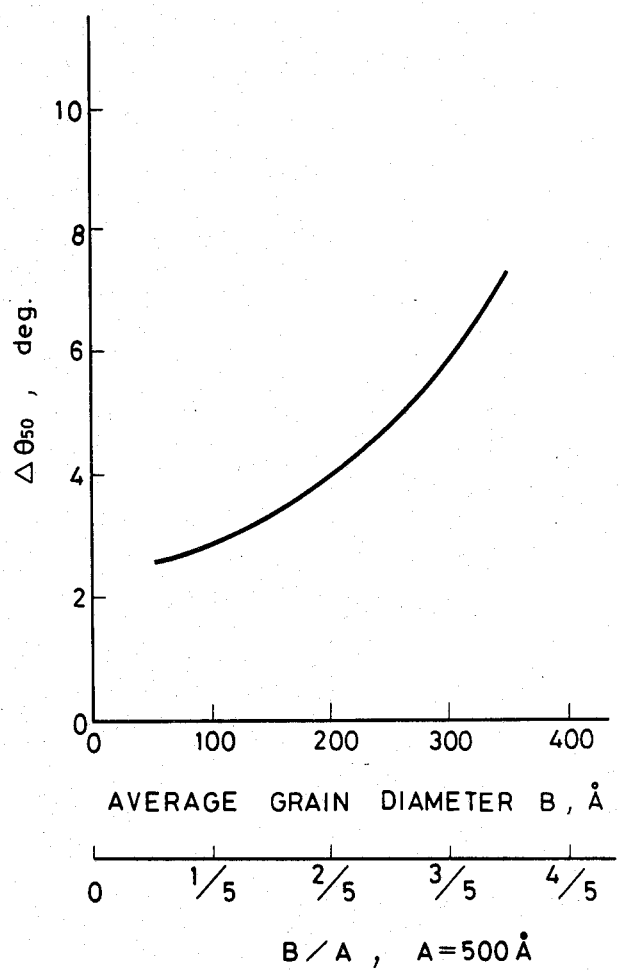
FIG. 5 is a graph showing the orientation of the perpedicularly magnetizable film in relation to the average grain diameter B of the high permeability layer.

X-ray diffraction analysis of these two-layer films indicated that axis [001] of Co-Cr is oriented perpendicular to the film surface. On the basis of the locking curve of the hcp (002) face, the half-value width $\Delta\theta_{50}$ was plotted with respect to the average grain diameter B of the permalloy films, obtaining a curve as shown in FIG. 5. This curve indicates that when the ratio of the average grain diameter B of permalloy film to the average grain diameter A of Co-Cr film, i.e., B/A is less than $\frac{1}{2}$, $\Delta\theta_{50}$ is less than 5°, that is, the films are suited for perpendicular recording. The films are best suited for perpendicular recording when B/A is less than 1/5, because $\Delta\theta_{50}$ is less than 3°.

Figure 6:
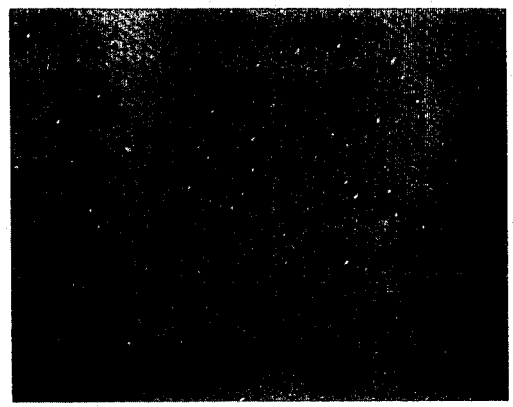
FIG. 6 is a photomicrograph showing the surface structure of the magnetic thin film prepared in Example.

FIG. 6 is a photomicrogragh ($\times 125$) of the sample having a B/A ratio equal to 2/5, indicating that the film surface is flat and smooth.

COMPARATIVE EXAMPLE

A substrate in the form of a 50 μm polyimide film mounted on a holder was placed in a vacuum chamber, which was evacuated to $2\times10^{-6}$ Torr. Argon gas was then introduced to a pressure of $5\times10-3$ Torr, and the substrate heated to 250°C. A permalloy was RF sputtered for 10 minutes with a power of 50 watts to form a permalloy film on the substrate. The permalloy film thus obtained had a composition of Fe:Ni:Mo of 17:78:5 by weight and a thickness of 0.5 μm. By observing a film section under TEM, the permalloy film was measured to have an average grain diameter B equal to 600 angstroms.

Next, a cobalt-chromium alloy was sputtered on the permalloy film under the same conditions as in Example 1 including the substrate temperature at room temperature. The cobalt-chromium film obtained had a composition of Co:Cr of 80:20 and a thickness of 0.5 μm. By observing a film section under TEM, the cobalt-chromium film was measured to have an average grain diameter equal to 500 angstroms.

X-ray diffraction analysis of the resulting two-layer film showed that the half-value width $\Delta\theta_{50}$ in the locking curve of the hcp (002) face was as large as 12°, that is, Co-Cr grains are rather poorly oriented.

Figure 7:
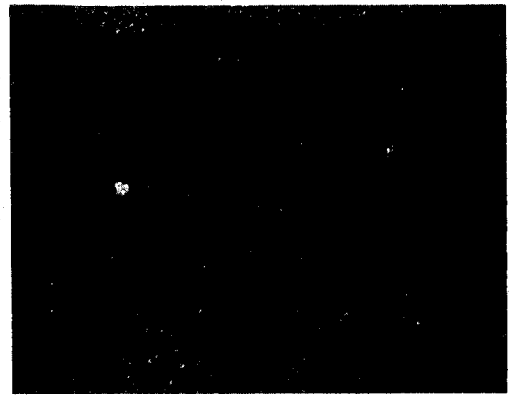
FIG. 7 is a photomicrograph showing the surface structure of the magnetic thin film prepared in Comparative Example.

FIG. 7 is a photomicrograph (×125) of this sample, indicating that the film surface is irregular.

In the above Example, the Co-Cr films had an equal average grain diameter A of 500 angstroms irrespective of the average grain diameters B of the permalloy films. In additional runs, Co-Cr films having different average grain diameters A were deposited on the permalloy films of Example 1 by using different Co-Cr compositions and varying evaporation conditions. It was found that for average grain diameters A in the range of 200 to 1000 angstroms, B is preferably less than ½ and more preferably less than 1/5 of A.

These facts indicate that the improved surface smoothness and orientation is not achieved by merely reducing the average grain diameters of both permalloy and Co-Cr films, but only when both the diameters are correlatively controlled. For example, when small grains of the permalloy film support small grains of similar size of the Co-Cr film, the orientation of the latter grains is not improved satisfactorily. It is believed that when each grain of the Co-Cr film is supported by a plurality of small grains of the permalloy film, surface segments defined by such a plurality of grains are leveled to impart improved orientation to Co-Cr grains.

This hypothesis seems useful in interpreting the experimental data.

As described above, the present invention provides perpendicular magnetizable magnetic recording media having improved surface smoothness and orientation.

What is claimed is:

1. A magnetic recording medium comprising a non-magnetic substrate and a magnetic thin film formed on the surface thereof said magnetic film comprising two layers, an upper layer having an average grain diameter A and a lower layer having an average grain diameter B, wherein the lower layer is contiguous to said upper layer and closer to the non-magnetic substrate, and the average grain diameter B of the lower layer is less than one half of the average grain diameter A of said upper layer.

2. The magnetic recording medium according to claim 1, wherein the average grain diameter of B is less than one-fifth that of A.

3. The magnetic recording medium according to claim 1, wherein the upper magnetic layer is a perpendicular magnetizable film and the lower magnetic layer is a low coercive force, high permeability magnetic film.

4. The magnetic recording medium according to claim 1, wherein the upper magnetic layer is of a cobalt-chromium alloy and the lower magnetic layer is of a permalloy.

5. The magnetic recording medium according to claim 4, wheein the average grain diameter of the upper magnetic layer is from 200–800 Å and the average grain diameter of the lower magnetic layer is from 70–400 Å.

6. The magnetic recording medium according to claim 1, wherein said thin film is not more than 10 μm.

* * * * *